United States Patent [19]
Yang

[11] Patent Number: 5,644,563
[45] Date of Patent: Jul. 1, 1997

[54] OPTICAL PICKUP SYSTEM

[75] Inventor: Keun Young Yang, Kyungki-do, Rep. of Korea

[73] Assignee: LG Electronics Inc., Seoul, Rep. of Korea

[21] Appl. No.: 478,751

[22] Filed: Jun. 7, 1995

[30] Foreign Application Priority Data

Jun. 10, 1994 [KR] Rep. of Korea .................. 13117/1994

[51] Int. Cl.$^6$ .................................................. G11B 7/135
[52] U.S. Cl. ........................ 369/112; 369/110; 369/109; 369/103; 369/44.23; 369/44.37
[58] Field of Search .......................... 369/112, 103, 369/108, 109, 110, 120, 100, 44.11, 44.12, 44.14, 44.23, 44.41, 44.37

[56] References Cited

U.S. PATENT DOCUMENTS

| | | | |
|---|---|---|---|
| 5,202,869 | 4/1993 | Miyake et al. | 369/112 X |
| 5,412,631 | 5/1995 | Komma et al. | 369/112 X |
| 5,428,596 | 6/1995 | Hineno et al. | 369/112 X |
| 5,436,876 | 7/1995 | Yokoyama et al. | 369/112 X |

Primary Examiner—Georgia Y. Epps
Assistant Examiner—Muhammad Edun
Attorney, Agent, or Firm—Fish & Richardson PC

[57] ABSTRACT

An optical pickup system capable of recording/reading out information on/from a mini disc or magneto-optical disc includes a polarized beam splitter (PBS) for fully reflecting beams of S-wave component from a laser diode or reflected from the disc while partially reflecting and partially transmitting beams of P-wave component, a reflection mirror placed between the PBS and disc for reflecting the beams transmitted through the PBS toward the disc while reflecting the beams reflected from the disc toward the PBS, a first photodetector having plural split areas for detecting a focus error and a tracking error according to the beams focusing on respective split areas, a hologram element for allowing three beams from a grating to be incident to the PBS or diffracting the beams of P-wave component transmitted through the PBS to focus the diffracted beams on the first photodetector, a second photodetector having six split areas for detecting the information recorded on the disc according to the beams focusing on respective split areas thereof, and a Wollaston prism placed between the PBS and second photodetector for separating mixed beams of P-wave and S-wave components from the PBS to allow the separated beams to be incident to the second photodetector, thereby decreasing the number of optical elements to improve readout speed of the information on the disc and simplifying the structure of the optical pickup system to reduce manufacturing cost.

12 Claims, 6 Drawing Sheets

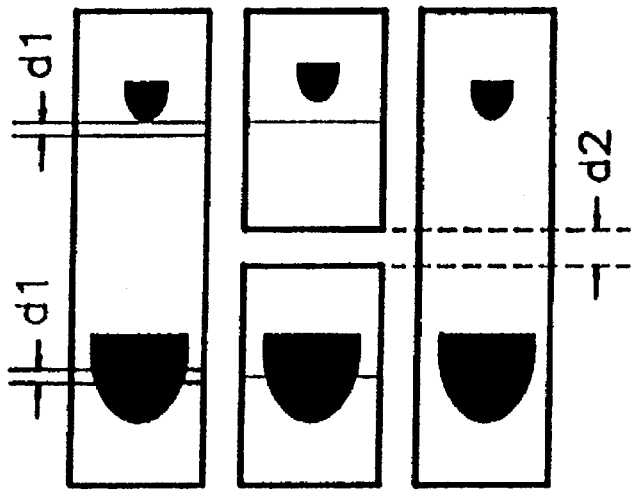
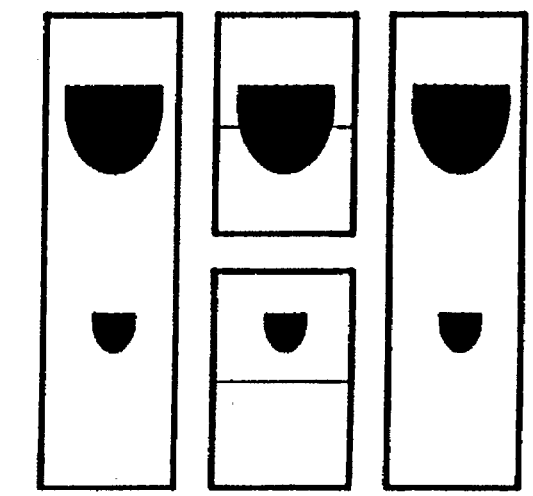
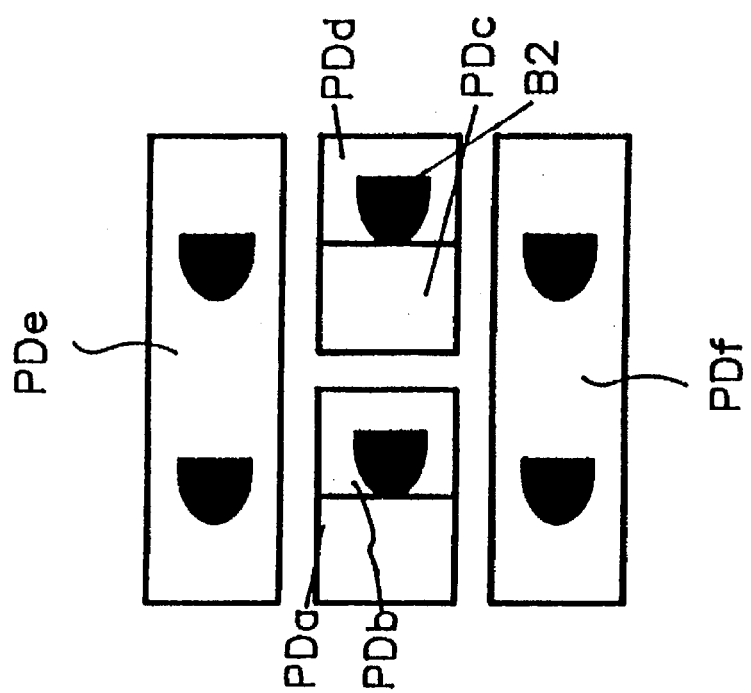

OPTICAL PICKUP SYSTEM

BACKGROUND OF THE INVENTION

1. Field of the Invention

The present invention relates to an optical pickup system, and more particularly to an optical pickup system capable of recording/reading out information on/from mini discs or magneto-optical discs.

2. Description of the Prior Art

FIG. 1 illustrates a construction of a conventional optical pickup system.

The optical pickup system shown in FIG. 1 for recording optical information on a disc 21 or reading out the optical information from the disc 21 includes a laser diode 11 which is a light source, a grating 12, a collimator 13, a polarizing beam splitter (hereinafter simply referred to as "PBS") 14, a reflection mirror 15, an objective lens 16, a modified Wollaston prism 17, an image-forming lens 18, a concave lens 19 and a photodetector divided-by-eight 20.

The grating 12 allows laser beams from the laser diode 11 to be one main beam for reading out the optical information recorded on the disc 21 and detecting a focus error and to be two sub-beams for detecting a tracking error of the disc 21. The collimator 13 makes the one main beam and two sub-beams passed through the grating 12 be parallel beams.

The PBS 14 fully reflects 100% of the S-wave component of the beams incident from the collimator 13 while reflecting some P-wave component and transmitting the other P-wave component to the reflection mirror 15. Also, the S-wave component of the beams reflected from the disc 21 is totally reflected to the Wollaston prism 17, and the P-wave component is partially reflected to the Wollaston prism 17 and partially transmitted.

The reflection mirror 15 reflects the three beams having P-wave component passed through the PBS 14 toward the disc 21, or reflects the three beams having P-wave and S-wave components reflected from the disc 21 to the PBS 14.

The objective lens 16 focuses the three beams having P-wave component reflected via the reflection mirror 15 onto the disc 21, or again alters the three beams having mixed P-wave and S-wave component reflected from the disc 21 to be parallel beams.

The Wollaston prism 17 receives the three beams reflected from the disc 21 via the PBS 14. In addition, as shown in FIG. 4, the main beam is separated into beams of S-wave, P-wave and (P+S)-wave components and the sub-beams are separated into beams of P-wave and S-wave components. Then, five beams of the separated three main beams and two sub-beams are incident to the image-forming lens 18.

The image-forming lens 18 is for concentrating five beams passed through the Wollaston prism 17. The concave lens 19 having a toric surface increases the angle of the beam passed through the image-forming lens 18 and, at the same time, produces astigmatism to the main beam passed through the image-forming lens 18 to detect the focus error.

The photodetector 20 divided-by-eight is partitioned into eight split areas as shown in FIG. 2, in which the central split areas a, b, c and d of the eight split areas are used for being focused by the beam of (S+P)-wave component separated from the main beam incident from the concave lens 19, so that the focus error is detected by a signal detected in the areas a, b, c and d. The areas e and f on the upper and lower portions of the areas a, b, c and d are for being focused by the beams of the P-wave and S-wave components respectively separated from the sub-beams, so that the tracking error is monitored by a difference between signals detected in the areas e and f. The areas i and j on the right and left of the areas a, b, c and d are for being focused by the beams of S-wave and P-wave components separated from the main beam, so that the optical information recorded on the disc 21 is read out by a signal detected on the areas i and j.

The operation of the conventional optical pickup system having the above-mentioned construction will be described with reference to FIGS. 2 to 6 as below.

The laser beams from the laser diode 11 which is the light source are diffracted into a main beam L1 and two sub-beams L2 and L3. The three beams L1 to L3 of the main beam and sub-beams are altered into the parallel beams by the collimator 13 to be incident to the PBS 14.

The PBS 14 reflects 100% of the S-wave component of the three beams and half of the P-wave component. The remaining 50% of the P-wave component are is transmitted. Therefore, the S-wave components of the incident beams are totally reflected by the PBS 14, and the P-wave component is partially reflected and partially transmitted by the PBS 14 to be incident to the reflection mirror 15. The reflection mirror 15 receives the beams of P-wave component from the PBS 14 to reflect the incident beams toward the disc 21, and the reflected beams focus onto the disc 21 via the objective lens 16.

As illustrated in FIG. 3, the three beams L1 to L3 of one main beam and two sub-beams focus on tracks 21-1 of the disc 21. Among the three beams, the main beam L1 is used for reading out the information and detecting the focus error, and two sub-beams L2 and L3 are used for detecting the tracking error. The three beams focusing on the tracks 21-1 of the disc 21 are reflected from the disc 21 while containing information required for reading out the optical information recorded on the disc 21 and detecting the focus error and tracking error. Here, the recorded optical information denotes pit information or kerr rotation by the magnetization direction.

At this time, the beams of P-wave component focus onto the disc 21, but the property differs in accordance with the presence and absence of the information on the tracks 21-1 of the disc 21. In more detail, if the information is not recorded on the track 21-1 of the disc 21, the beam reflected from the disc has the P-wave component without including the S-wave component, but the beam from the disc 21 is the mixed beam having both S-wave and P-wave components when the track 21-1 of the disc 21 has the information thereon.

The three beams reflected from the disc 21 via the objective lens 16 are incident to the PBS 14 by means of the reflection mirror 16. The PBS 14 reflects all S-wave component of the incident beams to the Wollaston prism 17, reflects 50% of P-wave component to the Wollaston prism 17, and transmits 50% of P-wave component. Accordingly, all S-wave component of the beams reflected from the disc 21 are reflected by the PBS 14 to be incident to the Wollaston prism 17, and only half of P-wave component is reflected by the PBS 14 to be incident to the Wollaston prism 17.

As shown in FIG. 4, the Wollaston prism 17 separates the incident main beam into three beams of S-wave, P-wave and (S+P)-wave components. Also, the sub-beams are separated into two beams of P-wave and S-wave components. Thereafter, the three beams reflected from the disc 21 are separated into the five beams via the Wollaston prism 17 to be incident to the concave lens 19 via the image-forming lens 18.

The concave lens 19 which has the toric surface for producing the astigmatism increases the angles between respective five beams incident from the image-forming lens 18 and, simultaneously produces the astigmatism with respect to the main beam for detecting the focus error. The five beams passed through the concave lens 19 focus onto the photodetector 20 divided-by-eight as shown in FIG. 5.

Therefore, in accordance with the shapes of the five beams focusing on respective areas of the photodetector 20 divided-by-eight, the tracking error and focus error are detected, and the information recorded on the optical disc 21 is read out.

To begin with, a tracking error signal TES by means of the sub-beams is detected by the beams focusing on the split areas e and f of the photodetector 20 divided-by-eight, which is given by the following equation (1).

$$TES = Se - Sf \quad (1)$$

where reference symbols Se and Sf respectively denote electrical signals of the beams focusing on the split areas e and f of the photodetector 20 divided-by-eight.

On the other hand, a focus error signal FES is detected by the beams focusing on the split areas a, b, c and d, which is expressed as:

$$FES = (Sa + Sc) - (Sb + Sd) \quad (2)$$

where reference symbols Sa, Sb, Sc and Sd respectively denote electrical signals of the beams focusing on the split areas a, b, c and d of the photodetector 20 divided-by-eight.

FIG. 6 illustrates the pattern variation of the beams focusing on the split areas a, b, c and d of the photodetector 20 divided-by-eight, in which the shape of the beam focusing on each split area varies in accordance with the change of the distance between the disc 21 and objective lens 16. That is, respective focusing patterns of the beams onto the split areas a, b, c and d are illustrated that no focus error appears by the normal spacing of the objective lens 16 from the disc 21, as shown in FIG. 6A, but the focus error appears due to a remote distance between the objective lens 16 and disc 21, as shown in FIG. 6B or a close distance between the objective lens 16 and disc 21 as shown in FIG. 6C.

In case of a magneto-optical disc, information of grooves formed in the disc is detected by constituting a signal system such as:

Address in Pregroove (ADIP)=(Sa+Sd)−(Sb+Sc) or
Absolute Time in Pregroove (ATIP).

As can be noted in the above equations (1) and (2), the tracking error signal TES becomes zero and the focus error signal FES equals zero when neither the tracking error nor the focus error occur.

The information recorded on the disc 21 is read out by means of the main beam of S-wave component focusing on the split area i of the photodetector 20 divided-by-eight and the main beam of P-wave focusing on the split area j thereof.

When a magneto-optical signal (kerr rotation by the magnetization direction) is read out, the optical information is read out by a signal difference of the beams focusing on the split areas i and j as defined by:

Optical Information Signal (magneto-optical signal)=Si−Sj  (3)

Meanwhile, a pit signal having an uneven shape recorded on the disc 21 is read out by variation of the amount of the beams focusing on the split areas i and j of the photodetector 20 divided-by-eight as shown in the following equation:

optical information signal (pit signal)=Si+Sj where the reference symbols Si and Sj respectively denote electrical signals of the beams focusing on the split areas i and j of the photodetector 20 divided-by-eight.

However, the conventional optical pickup system as described above has drawbacks. More specifically, since the astigmatism has heretofore used for detecting a focus error by means of three beams, a concave lens having the toric surface which is expensive and is difficult in fabricate is employed to generate the astigmatism. Moreover, a modified Wollaston prism involving a fastidious fabrication process is utilized to separate a mixed beam of (P+S)-wave component for detecting the focus error from a main beam reflected from a disc. In order to allow beams from a laser diode to be partially incident to the disc or beams reflected from the disc to be partially incident to the modified Wollaston prism, a pentagonal polarized beam splitter is applied which is also difficult to be fabricated.

As the result, the conventional optical pickup system involves problems of complicated structure and expensive manufacturing cost since numerous optical elements are used for reading out information recorded on the disc which includes expensive elements which are difficult to fabricating. Furthermore, the increased number of optical elements raises the inherent weight of the optical pickup system to lengthen access time for reading out the information recorded on the disc, thereby delaying the speed of reading out the information.

SUMMARY OF THE INVENTION

It is an object of the present invention to provide an optical pickup system capable of recording/reading out information on/from a disc in a three beam system by means of a hologram divided-by-two.

It is another object of the present invention to provide an optical pickup system for improving readout speed of information recorded on a disc by reducing the number of optical elements.

It is still another object of the present invention to provide an optical pickup system having a simple structure capable of reducing manufacturing cost.

To achieve the above and other objects of the present invention, an optical pickup system includes a laser diode used as a light source, and a polarized beam splitter which totally reflects beams of S-wave component emitted from the laser diode or reflected from the disc, and partially reflects beams of P-wave component while partially transmitting the beams of P-wave component. In addition, a grating placed between the laser diode and polarized beam splitter classifies the beams from the laser diode into one main beam and two sub-beams to allow the three beams to be incident to the polarized beam splitter. A reflection mirror placed between the polarized beam splitter and disc reflects the beams transmitted through the polarized beam splitter toward the disc, and reflects the beams reflected from the disc toward the polarized beam splitter. An objective lens placed between the reflection mirror and disc focuses the beams reflected by the reflection mirror or allows the beams reflected from the disc to be parallel beams, and a first photodetector having a plurality of split areas is used for detecting a focus error and a tracking error in accordance with the beams focusing on respective split areas. A hologram element divided-by-two placed between the grating and polarized beam splitter is formed of two semi-circular holograms for allowing the three beams from the grating to be incident to the polarized beam splitter or diffracting the beams of P-wave component transmitted through the polarized beam splitter to focus the diffracted beams on the first photodetector, in which one of the holograms has a reference light position at a light-emitting point of the laser diode and an object light position set before passing the first photodetector, and the other of the hologram has a reference light position at the light-emitting point of the laser diode and an object light position set after passing the first photodetector. Furthermore, a second photodetector having partitioned six split areas is employed for detecting the information recorded on the disc in accordance with the beams focusing on respective split areas thereof, and a Wollaston prism placed between the polarized beam splitter and second photodetector separates mixed beams of P-wave and S-wave components from the polarized beam splitter to allow the separated beams to be incident to the second photodetector.

BRIEF DESCRIPTION OF THE DRAWINGS

The above objects and other advantages of the present invention will become more apparent by describing in detail preferred embodiments thereof with reference to the attached drawings in which:

FIGS. 6A–6C show a focusing state of the beam in accordance with the distance between the disc and objective lens of FIG. 1, wherein FIG. 6A–6C show a state of maintaining normal distance between the disc and objective lens, FIG. 6B shows a state of setting the disc to be distant from the objective lens, and FIG. 6C shows a state of setting the disc to be near to the objective lens;

FIGS. 7A–7B show a construction of one embodiment of an optical pickup system according to the present invention, wherein FIG. 7A is the construction of the optical pickup system shown in the x-z direction at the central point of the disc, and FIG. 7B is the construction of the optical pickup system shown in the x-y direction at the central point of the disc;

FIGS. 10A–10C show a focusing state of the laser beams in accordance with the distance between the disc and objective lens of FIG.7, wherein FIG. 10A shows a state of maintaining normal distance between the disc and objective lens, FIG. 10B shows a state of setting the disc to be distance from the objective lens, and FIG. 10C shows a state of setting the disc to be near to the objective lens;

DETAILED DESCRIPTION OF THE PREFERRED EMBODIMENT

Figure 1:
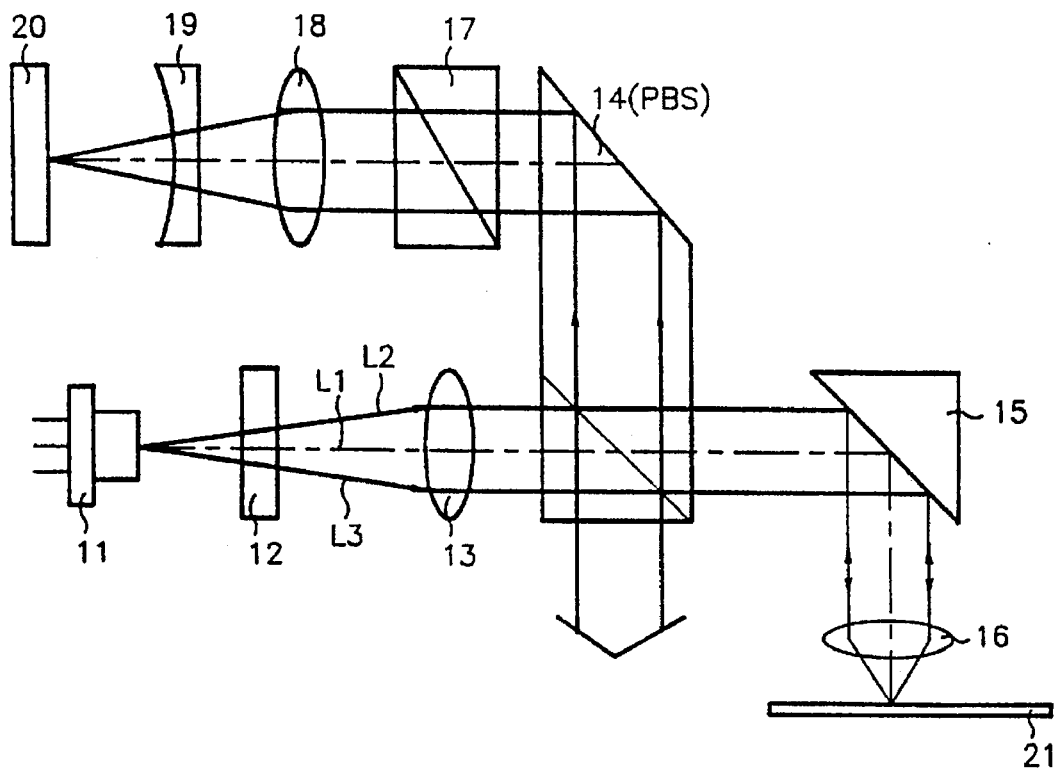
FIG. 1 is a view showing a construction of a conventional optical pickup system.
Figure 2:
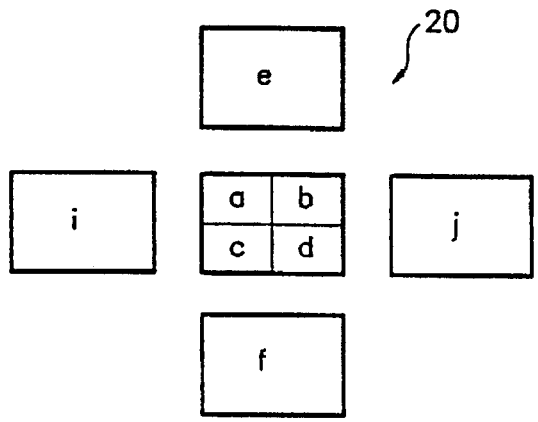
FIG. 2 shows the structure of the photodetector divided-by-eight in the conventional optical pickup system of FIG. 1.
Figure 3:
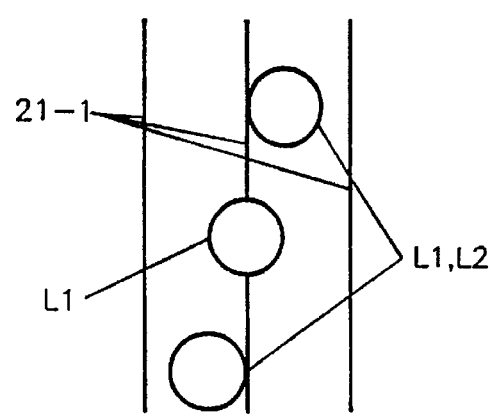
FIG. 3 shows focusing states of three beams on the disc of FIG. 1.
Figure 4:
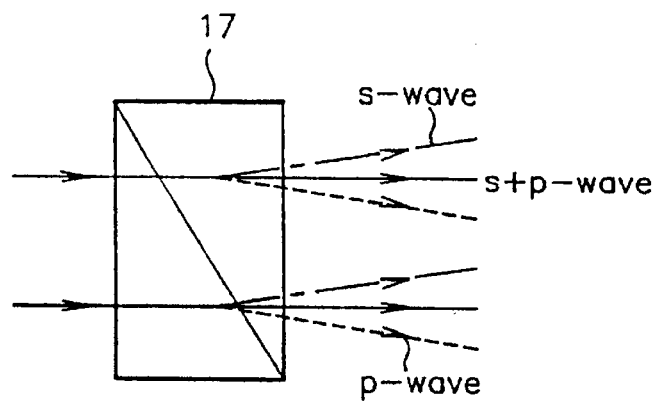
FIG. 4 is a view showing the separated states of the S-wave and P-wave by means of the prism of FIG. 1.
Figure 5:
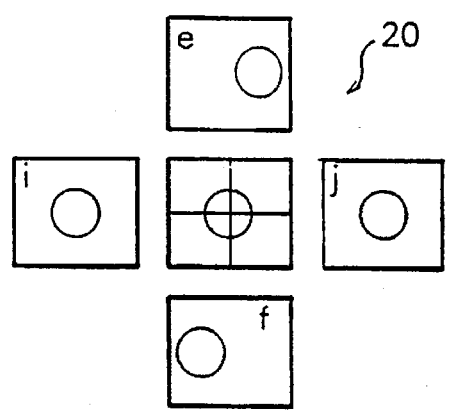
FIG. 5 shows focusing states of the five beams onto the photodetector divided-by-eight of FIG. 2.
Figure 6A:
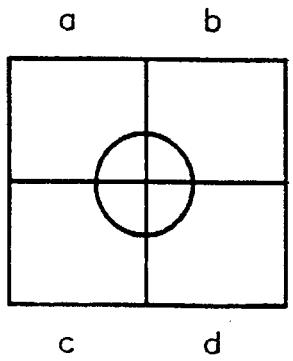
Figure 6B:
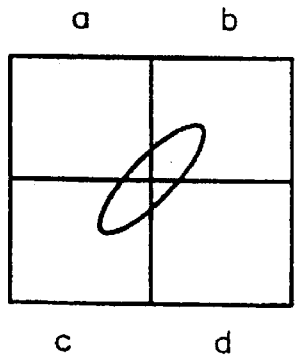
Figure 6C:
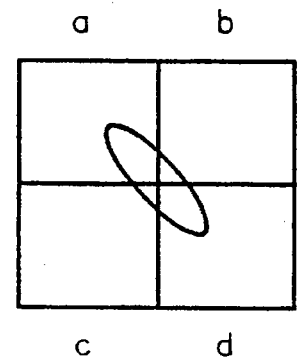
Figure 7A:
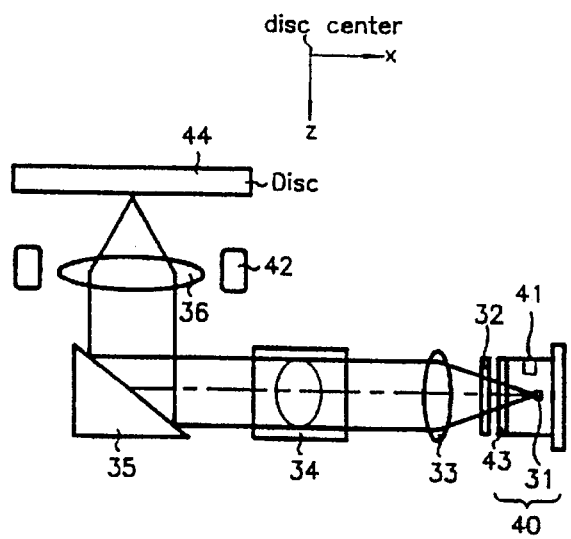
Figure 7B:
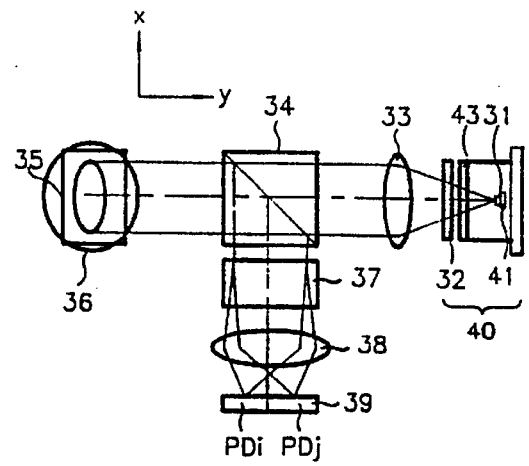

Referring to FIGS. 7A–7B, an embodiment of an optical pickup system according to the present invention includes a collimator 33, a polarized beam splitter (hereinafter referred to as "PBS") 34, a reflection mirror 35, an objective lens 36, a prism 37, a focusing lens 38, a photodetector 39 divided-by-two, an actuator 42 and a hologram laser unit 40.

The hologram laser unit 40 has a laser diode 31 being a light source, a grating 43 for allowing the laser beams from the laser diode 31 to be formed into three beams comprising one main beam and two sub-beams, a hologram element 32 for making the three beams from the grating 43 be incident to the PBS 34 via the collimator 33 or beams reflected from a disc 44, and a photodetector 41 divided-by-six for focusing the beam diffracted by the hologram element 32.

The collimator 33 permits the three beams incident from the grating 43 to be parallel beams or the main beam of P-wave component transmitted through the PBS 34 to be incident to the hologram element 32 divided-by-two.

The PBS 34 which is positioned between the reflection mirror 35 and collimator 33 in the x-z direction and between the reflection mirror 35 and Wollaston prism 37 in the x-y direction receives the three parallel beams passed through the collimator 33 to fully reflect the S-wave component, reflect 33% of the P-wave component and transmit the remaining 67% of the P-wave component.

In other words, since the a PBS 34 has the reflection ratio of 7:3 to 6:4 with respect to the beams of P-wave component, the S-wave component of the beams passed through the collimator 33 is fully reflected, and 33% of P-wave component is reflected while the remaining 67% of P-wave component is transmitted to the reflection mirror 35. Meantime, the S-wave component of the beams reflected from the disc 44 is fully reflected to the Wollaston prism 37, 33% of the P-wave component is reflected to the Wollaston prism 37, and the remaining 67% of the P-wave component is transmitted to the hologram element 32 divided-by-two.

The reflection mirror 35 disposed between the PBS 34 and objective lens 36 reflects the beams of P-wave component passed through the PBS 34 to the objective lens 36 to focus them on the disc 44, and reflects the beams reflected from the disc 44 via the objective lens 36 to the PBS 34. Here, the beams reflected from the reflection mirror 35 toward the disc 44 includes only the P-wave component, and the beams reflected from the disc 44 toward the PBS 34 is the mixed beam having the S-wave according to the existence of information on the disc 44.

Figure 11:
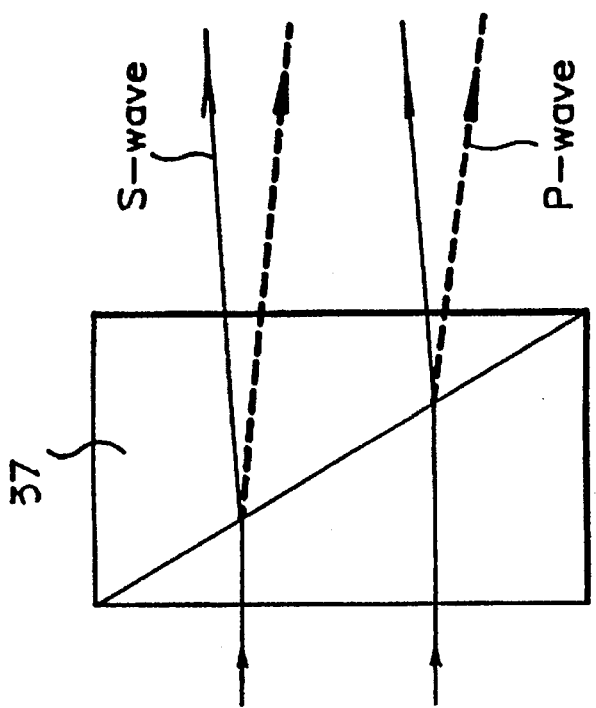
FIG. 11 is a view showing the separated state of the S-wave and P-wave by means of the prism of FIG. 7.

The Wollaston prism 37 placed between the PBS 34 and focusing lens 38 separates the mixed beam having S-wave and P-wave incident from the PBS 34 into beams of P-wave component and S-wave component to make the separated beams be incident to the focusing lens 38. As illustrated in FIG. 11, the beams of P-wave component and S-wave component are separated by maintaining a certain angle. In the conventional technique, the (S+P)-wave obtained by mixing S-wave component and P-wave component is utilized for detecting a focus error, so that the S-wave, P-wave and (S+P)-wave are separated from the main beam by means of the modified Wollaston prism. Whereas, in the optical pickup system according to the present invention, the beams of S-wave and P-wave are utilized for detecting the focus error, so that just the S-wave and P-wave are separated by means of a general Wollaston prism.

The focusing lens 38 positioned between the Wollaston prism 37 and photodetector 39 divided-by-two focuses the beam of P-wave component and beam of S-wave component separated from the prism 37 onto the photodetector 39 divided-by-two. The beams of S-wave component and P-wave component from the Wollaston prism 37 focus on the photodetector 39 divided-by-two succeeding the focusing lens 38 via the focusing lens 38, which are consequently used for monitoring information recorded on the disc.

Figure 8A:
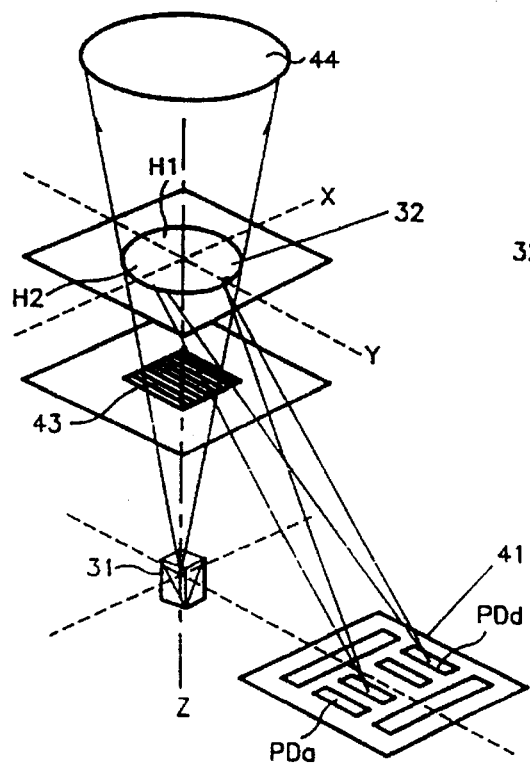
FIG. 8A shows a construction of the hologram laser unit of FIG. 7.
Figure 8B:
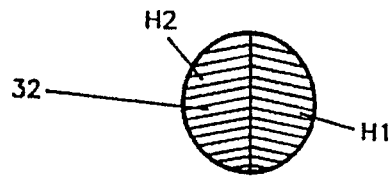
FIG. 8B is a detailed view of the hologram element shown in FIG. 8A.
Figure 8C:
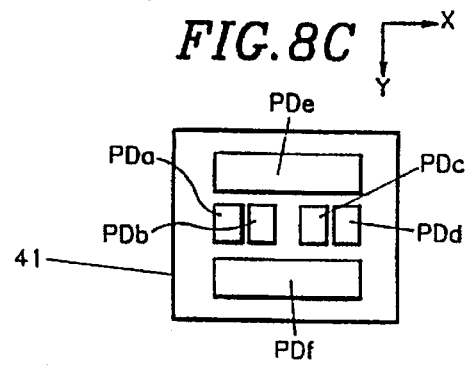
FIG. 8C is a detailed view of the photodetector divided-by-six shown in FIG. 8A.

FIG. 8A shows a construction of the hologram laser unit of FIGS. 7A–7B, FIG. 8B is a detailed view of the hologram element shown in FIG. 8A, and FIG. 8C is a detailed view of the photodetector divided-by-six shown in FIG. 8A.

When the beams from the laser diode 31 are incident to the PBS 34, the laser diode 31 is provided in such a manner that an activation layer thereof is to be parallel with the xy plane to allow the beams to be P-polarized.

The hologram element 43 divided-by-two functions by permitting the three beams from the grating 32 to be incident to the collimator 33, or diffracting the beams of P-wave component reflected from the disc 44 prior to being transmitted through the PBS 34 to focus the diffracted beams on the photodetector 41 divided-by-six.

As shown in FIG. 8C, the photodetector 41 divided-by-six is formed of first to fourth split areas PDa to PDd respectively having a prescribed size arranged in the horizontal direction, and fifth and sixth split areas PDe and PDf of the same size as summing the first to fourth split areas PDa to PDd while being arranged on the upper and lower portions of them. The first and second split areas PDa and PDb, and the third and fourth split areas PDc and PDd are spaced by a predetermined distance d1, and a distance d2 between the second and third split areas PDb and PDc is arranged to be wider than the distance d1.

As shown in FIG. 8B, the hologram element 32 divided-by-two is formed of two semi-circular holograms H1 and H2, and the site of a reference light of the two holograms H1 and H2 is set as a light-emitting point of the laser diode. The site of an objective light of the hologram H1 of the hologram element 32 divided-by-two is set to a point Q1 before passing through the photodetector 41 divided-by-six, and that of the hologram H2 is set to a point Q2 after passing through the photodetector 41 divided-by-six.

Figure 9A:
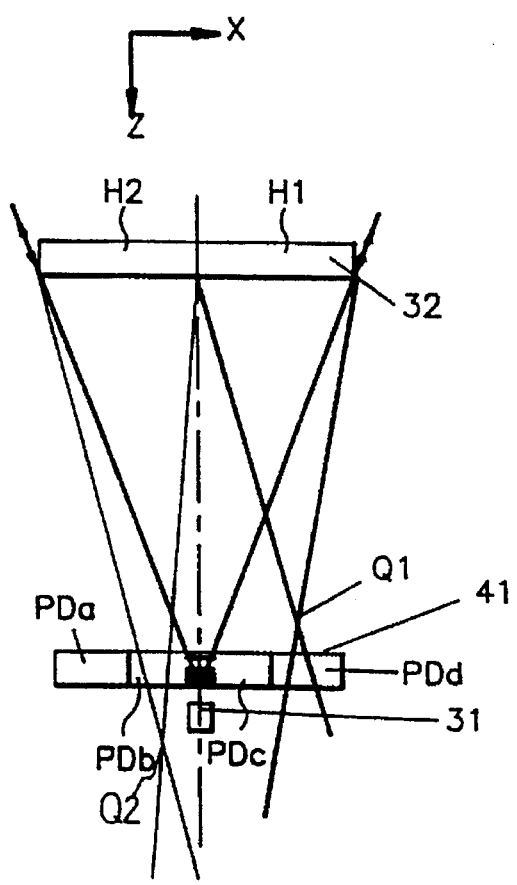
FIG. 9 is a view showing the diffraction of the laser beams by means of the hologram module of FIG. 8.
Figure 9B:
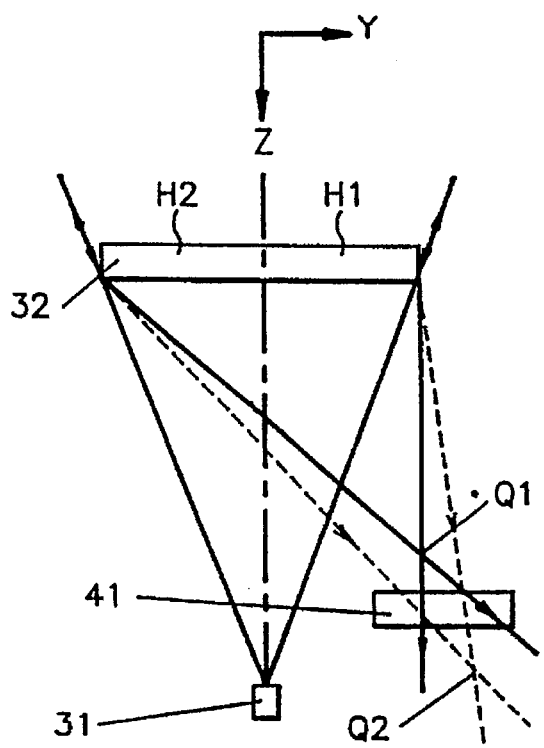

Referring now particularly to FIG. 9, once the beams focusing toward the light-emitting point of the laser diode 31 are incident to the hologram element 32 divided-by-two, the laser beams incident to the hologram H1 focus onto the point Q1 before passing through the fourth split area PDd of the photodetector 41 divided-by-six, i.e., onto the site between the photodetector 41 divided-by-six and hologram element 32 divided-by-two, and the laser beams incident to the hologram H2 focus onto the point Q2 at the site after passing through the second split area PDb of the photodetector 41 divided-by-six.

Therefore, the beams diffracted by the hologram element 32 divided-by-two focus on the photodetector 41 divided-by-six as shown in FIG. 10A, in which the main beam diffracted by the hologram H1 focuses on the fourth split area PDd contacting the boundary plane of the third and fourth split areas PDc and PDd of the photodetector 41 divided-by-six (refer to B2 shown in FIG. 10A), and the main beam diffracted by the hologram H2 focuses on the second split area PDb contacting the boundary plane of the first and second split areas PDa and PDb of the photodetector 41 divided-by-six (refer to B1 of FIG. 10A).

The operation of the optical pickup system having the above-mentioned construction will be described with reference to FIGS. 8A to 12 as below.

The laser beams from the laser diode 31 are classified into the three beams of one main beam and two sub-beams via the grating 43 to be incident to the collimator 33 through the hologram element 32 divided-by-two.

The three beams incident to the collimator 33 are transformed into the parallel beams to be incident to the PBS 34. Then, the PBS 34 having the reflection ratio of 7:3 to 6:4 with respect to the beams of P-wave component fully reflects the S-wave component of the incident three beams, reflects 33% of the P-wave component, and transmits remaining 67% of the P-wave to the reflection mirror 35.

Thereafter, the reflection mirror 35 reflects the incident beams of P-wave component to change the advancing direction of the beams toward the disc 44. The three beams reflected through the reflection mirror 35 focus on the disc 44 by means of the objective lens 36.

The beams focusing on the disc 44 are reflected therefrom to be the parallel beams via the objective lens 36 and then reflected to the PBS 34 via the reflection mirror 35. At this time, the beams reflected from the disc 44 are mixed beams having both the P-wave and S-wave.

If information is recorded on the disc 44, the beams incident to the PBS 34 include the P-wave component together with the S-wave component. In case of no information on the disc 44, only the P-wave exists in the incident beams without including the S-wave component.

The S-wave component in the beams incident to the PBS 34 is fully reflected via the PBS 34 to be incident to the Wollaston prism 37, and 67% of the P-wave component is transmitted to be incident to the collimator 33 while 33% thereof is reflected to be incident to the Wollaston prism 37.

Figure 12:
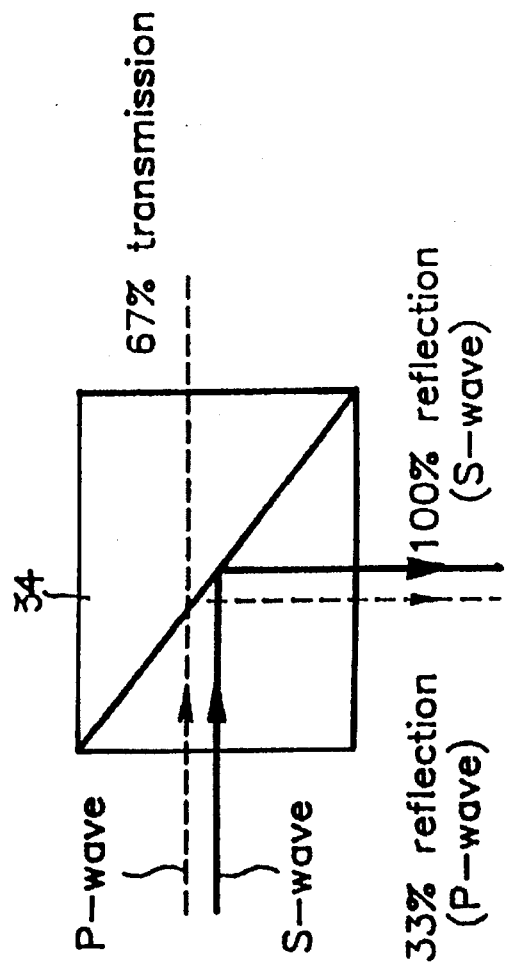
FIG. 12 is a view showing the polarized states of the S-wave and P-wave by the polarized beam splitter of FIG. 7.

The Wollaston prism 37 receives the mixed beam of 100% reflected S-wave component and 33% reflected P-wave component, and separates the incident mixed beam into the beams of P-wave component and S-wave component which maintain a certain angle to each other as shown in FIG. 12. Since the focus error is not detected by using the beam of mixing (S+P)-wave in the optical pickup system according to the present invention, there is no need to separate the (P+S)-wave by means of the modified Wollaston prism as in the conventional technique. Consequently, in the present invention, the general Wollaston prism 37 is employed to only separate the P-wave and S-wave maintaining the certain angle to each other.

The beams separated by the Wollaston prism 37 focus onto the photodetector 39 divided-by-two via the focusing lens 38.

The information recorded on the disc 44 is read out by the beams focusing on the photodetector 39 divided-by-two, which is detected by a signal difference of two split areas PDi and PDj of the photodetector 39 divided-by-two when the information recorded on the disc 44 is a magneto-optical signal (kerr rotation by the magnetization direction). This is expressed by the following equation (5).

Optical Information Signal (magneto-optical signal)=$Si-Sj$ (5)

where reference symbols Si and Sj respectively denote electrical signals on the split areas PDi and PDj of the photodetector 39 divided-by-two.

In case of a pit signal having an uneven shape recorded on the disc 44 is detected by the variation of the amount of the beams focusing on the split areas as defined in the following equation.

$$\text{Optical Information Signal (Pit Signal)} = Si + Sj \qquad (6)$$

Now, the detecting operation of a tracking error signal and a focus error signal will be described.

The three beams having 67% of P-wave component transmitted through the PBS 34 are incident to the hologram element 32 divided-by-two via the collimator 33, and the three beams of P-wave component are diffracted through the hologram element 32 to focus onto the photodetector 41 divided-by-six to be used for detecting the focus error signal and tracking error signal.

In more detail, the three beams transmitted through the PBS 34 focus toward a light-emitting surface of the laser diode 31 by means of the collimator 33. The three beams focusing toward the light-emitting surface of the laser diode 31 are incident to the hologram element 32 divided-by-two placed between the objective lens 36 and laser diode 31 to serve as a reference light of the two holograms H1 and H2 of the hologram element 32 divided-by-two.

Thus, as shown in FIG. 9, the beams focus onto points Q1 and Q2 by the holograms H1 and H2 to reproduce an object light which is then detected by the photodetector 41 divided-by-six, thereby detecting the tracking error and focus error.

When the main beam of P-wave component is incident to the hologram element 32 divided-by-two via the collimator 33, the main beam focuses the point Q1 before passing through the fourth split area PDd of the photodetector 41 divided-by-six by means of the hologram H1, so that the section of the beam cut by the photodetector 41 divided-by-six is placed on the fourth split area PDd while contacting the boundary plane of the third and fourth split areas PDc and PDd as shown in FIG. 10A. Also, the main beam focuses on the point Q2 after passing through the second split area PDb of the photodetector 41 divided-by-six by the hologram H2, so that the section of the beam cut by the photodetector 41 divided-by-six is placed on the second split are PDb while contacting the boundary plane of the first and second split areas PDa and PDb as shown in FIG. 10A.

As described above, the focus error is detected by the main beam focusing onto the first to fourth split areas PDa to PDd of the photodetector 41 divided-by-six by the holograms H1 and H2. When the focus error does not occur, the distance between the objective lens 36 and disc 44 is properly maintained to form the beams shaped as half moons of the same size on the second and fourth split areas PDb and PDd of the photodetector 41 divided-by-six as shown in FIG. 10A.

If the disc 44 is placed distant from the objective lens 36, the points Q1 and Q2 focused by the holograms H1 and H2 become near to each other. Thus, as shown in FIG. 10B, the size of the beam focusing on the fourth split area PDd by the hologram Hi is increased to affect onto the third split area PDc, but the size of the beam focusing onto the second split area PDb by the hologram H1 is decreased not to affect on the first split area PDa.

On the other hand, if the disc 44 is near to the object lens 36, the points Q1 and Q2 focused by the holograms HI and H2 become distant from each other. Thus, as shown in FIG. 10C, the size of the beam focusing on the fourth split area PDd by the hologram Hi is decreased not to affect on the third split area PDc, but the size of the beam focusing onto the second split area PDb by the hologram H2 is increased to expand to the first split area PDa.

The focus error signal is obtained by the following equation:

$$FES = (Sa + Sd) - (Sb + Sc) \qquad (7)$$

where reference symbols Sa, Sb, Sc and Sd respectively denote electrical signals on the split areas PDa, PDb, PDc and PDd of the photodetector 41 divided-by-six.

When the focus error does not exist, the focus error signal FES equals zero in the above equation because the amount of beams incident to the first and fourth split areas PDa and PDd of the photodetector 41 divided-by-six are the same as the beams incident to the second and third split areas PDb and PDc, as shown in FIG. 10A. When the objective lens 36 is distant from the disc 44, the amount of the beams incident to the first and fourth split areas PDa and PDd of the photodetector 41 divided-by-six is greater than that of the beams incident to the second and third split areas PDb and PDc, as shown in FIG. 10B, so that the focus error signal FES is smaller than zero. Meanwhile, when the objective lens 36 is near to the disk 44, the amount of beams incident to the first and fourth split areas PDa and PDd is smaller than that incident to the second and third split areas PDb and PDc as shown in FIG. 10C, the focus error FES is larger than zero.

In this way, if the focus error appears due to improper distance between the disc 44 and objective lens 36, the focus error can be corrected by moving objective lens 36 up-and-down direction, using the actuator 42 in accordance with the focus error signal FES.

Hereinafter, the correction of the tracking error according to the present invention will be described.

The tracking error signal TES is detected by the sub-beams of P-wave component diffracted by the hologram H1 and H2 and then focusing on the fifth and sixth split areas PDe and PDf of the photodetector 41 divided-by-six, which is given by the following equation (8).

$$TES = Se - Sf \qquad (8)$$

When tracking error occurs, the actuator 42 is used to move the objective lens 36 in the right-to-left direction, thereby correcting the tracking error.

On the other hand, the information with respect to grooves formed in the disc is constituted such that:

Address in Pregroove (ADIP)=(Sa+Sb)−(Sc+Sd) or by Absolute Time in Pregroove (ATIP), thereby reading out the information with respect to the grooves.

In the optical pickup system according to the present invention as described above, a hologram element divided-by-two is employed to correct a tracking error and a focus error and read out information with respect to grooves formed in a disc, so that magneto-optical signal or optical information (pit) signal recorded on the disc can be accurately detected. Furthermore, optical elements such as a concave lens is not utilized to decrease the number of optical elements employed. In addition to these, a polarized beam splitter and a Wollaston prism easier to be fabricated than those of the conventional technique are used, thereby simplifying the structure of the optical pickup system and reducing manufacturing cost thereof.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An optical pickup system capable of reading out/ recording information from/on a disc comprising:

a laser diode used as a light source;

a polarized beam splitter for totally reflecting beams of an S-wave component of the light emitted from said laser diode or reflected from said disc, and partially reflecting beams of a P-wave component while partially transmitting said beams of the P-wave component;

a grating placed between said laser diode and said polarized beam splitter for classifying said beams from said laser diode into one main beam and two sub-beams to allow the three beams to be incident to said polarized beam splitter;

a reflection mirror placed between said polarized beam splitter and said disc for reflecting the beams transmitted through said polarized beam splitter toward said disc, and reflecting the beams reflected from said disc toward said polarized beam splitter;

an objective lens placed between said reflection mirror and said disc of focusing the beams reflected by said reflection mirror onto said discs and for causing the beams reflected from said disc to form parallel beams;

a first photodetector having a plurality of split areas for detecting a focus error and a tracking error in accordance with the beams focusing on respective split areas;

a hologram element divided-by-two placed between said grating and said polarized beam splitter, said hologram element being formed of two semicircular holograms for allowing said three beams from said grating to be incident to said polarized beam splitter or diffracting said beams of said P-wave component transmitted through said polarized beam splitter to focus the diffracted beams on said first photodetector, one of said holograms having a reference light position at light-emitting point of said laser diode and an object light position set before passing said first photodetector, the other of said holograms having a reference light position at said light-emitting point of said laser diode and an object light position set after passing said first photodetector;

a second photodetector being partitioned into six split areas for detecting said information recorded on said disc in accordance with the beams focusing on respective split areas thereof; and a Wollaston prism placed between said polarized beam splitter and said second photodetector for separating mixed beams of P-wave and S-wave components from said polarized beam splitter to allow the separated beams to be incident to said second photodetector.

2. An optical pickup system as claimed in claim 1, further comprising an actuator for moving said objective lens in an up an down or left and right direction with respect to said disc, to correct a focus error signal or a tracking error signal.

3. An optical pickup system as claimed in claim 1, wherein, when the disc surface is defined as the xy-plane and the direction perpendicular to said disc is set as the z-axis, an activation layer of a semiconductor laser is provided to be parallel to said xy-plane for P-polarizing beams incident from said laser diode to said polarized beam splitter.

4. An optical pickup system as claimed in claim 1, wherein said beams of P-wave and S-wave components are separated by said Wollaston prism while maintaining a regular angle to each other.

5. An optical pickup system as claimed in claim 1, wherein said first photodetector is formed of first to fourth split areas of the same size along the horizontal direction and fifth and sixth split areas of a size the same as the sum of said first to fourth areas altogether respectively arranged on the upper and lower portions of said first to fourth split areas, a distance between said first and second split areas being the same as a distance between said third and fourth split areas but shorter than a distance between said second and third split areas.

6. An optical pickup system as claimed in claim 5, wherein said focus error signal is detected by a signal difference between the beams focusing on said first and fourth split areas and the beams focusing on said second and third split areas of said photodetector divided-by-six.

7. An optical pickup system as claimed in claim 5, wherein said tracking error signal is detected by a signal difference between the beams focusing on said fifth and sixth split areas of said photodetector divided-by-six.

8. An optical pickup system as claimed in claim 5, wherein information with respect to grooves in said disc is detected by a signal difference between the beams focusing on said first and second split areas and the beams focusing on said third and fourth split areas of said photodetector divided-by-six.

9. An optical pickup system as claimed in claim 1, wherein said second photodetector is a photodetector divided-by-two having two split areas.

10. an optical pickup system as claimed in claim 9, wherein, when said information on said disc is magneto-optical information, which is detected by a signal difference between the beams focusing on said split areas of said photodetector divided-by-two.

11. An optical pickup system as claimed in claim 9, wherein, when said information on said disc is pit information, said optical information on said disc is detected by variation of the amount of the beams focusing on respective split areas of said photodetector divided-by-two.

12. An optical pickup system as claimed in claim 1, wherein the reflection ratio of said P-wave component of said polarized beam splitter is 7:3 to 6:4.

* * * * *